United States Patent [19]

Rumpke

[11] Patent Number: 4,861,110
[45] Date of Patent: Aug. 29, 1989

[54] TILT TRUCK APPARATUS

[76] Inventor: Joseph M. Rumpke, 3642 Kirchling Rd., Hamilton, Ohio 45013

[21] Appl. No.: 203,889

[22] Filed: Jun. 8, 1988

[51] Int. Cl.[4] .............................................. B62B 1/00
[52] U.S. Cl. .......................................... 298/2; 298/5; 280/47.12
[58] Field of Search ...................... 298/1 A, 1 C, 2, 3, 298/5, 17 B; 280/47.31, 47.12, 62

[56] References Cited

U.S. PATENT DOCUMENTS

| | | | |
|---|---|---|---|
| 1,207,953 | 12/1916 | McClure | 298/2 |
| 1,769,271 | 7/1930 | Parsons | |
| 2,102,684 | 12/1937 | Dorward | 280/47.12 |
| 2,124,956 | 7/1938 | Roemer | 280/47.12 |
| 2,485,085 | 10/1949 | Burch | |
| 3,028,695 | 4/1962 | Westby | 298/2 X |
| 3,029,984 | 4/1962 | Cooper | 298/3 X |
| 3,178,228 | 4/1965 | Gibson et al. | 298/5 X |
| 3,488,091 | 1/1970 | Baker | |
| 3,858,929 | 1/1975 | Brescia | 280/47.12 |
| 3,875,981 | 4/1975 | Brenner et al. | 298/2 X |
| 4,353,596 | 10/1982 | Gibson | 298/5 X |
| 4,632,461 | 12/1986 | Randolph | 298/5 X |
| 4,645,225 | 2/1987 | Eubanks | 280/47.31 |

FOREIGN PATENT DOCUMENTS

| | | | |
|---|---|---|---|
| 0542045 | 10/1955 | Belgium | 298/2 |
| 0925645 | 5/1963 | United Kingdom | 298/2 |

Primary Examiner—Frank E. Werner
Assistant Examiner—James R. Bidwell
Attorney, Agent, or Firm—Leon Gilden

[57] ABSTRACT

An improved tilt truck apparatus is set forth wherein a plastic-like container is removably transportable by an associated cart wherein forward and rear upward terminal edges of the basket are basket with re-enforcing bars to accommodate stresses associated in use with the apparatus. A rearward reenforcing bar is provided with an extension projecting within an overlying lip of said container and formed with a flexible tether line securable to the associated cart to prevent overtipping of the cart wherein a plurality of forwardly adjustable arcuate bars are secured to forwardmost portions of the apparatus to prevent the container from overtipping during an emptying procedure.

8 Claims, 1 Drawing Sheet

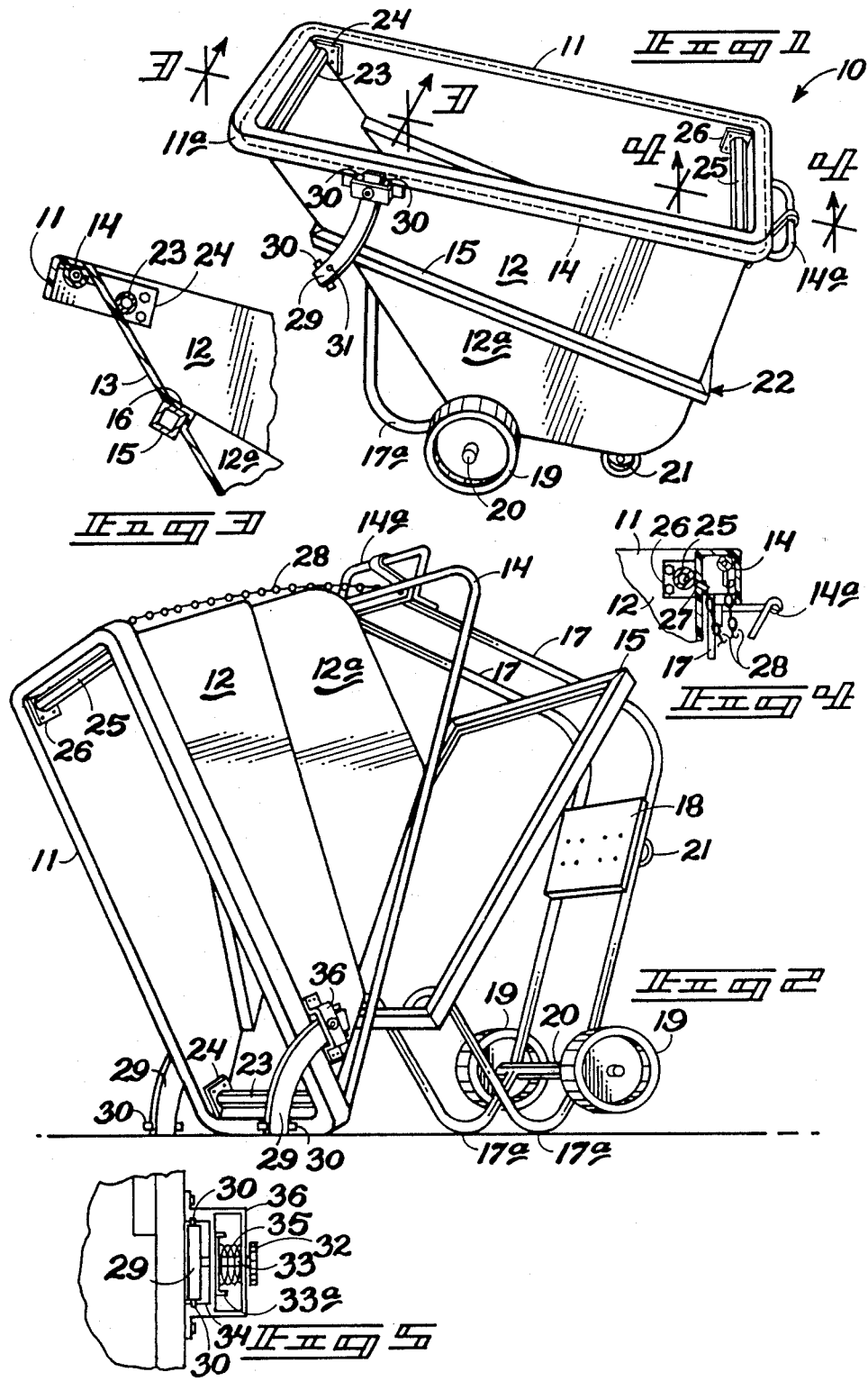

TILT TRUCK APPARATUS

BACKGROUND OF THE INVENTION

1. Field of the Invention

The field of invention relates to portable transporting carts, and particularly pertains to a new and improved tilt truck apparatus provided with re-enforcing and convenience means for preventing overtipping of the associated container during use, as well as prolonging the life of the apparatus.

2. Description of the Prior Art

The use of wheel-about truck apparatus for transport and dumping of materials is well known in the prior art. These devices have typically been formed of plastic-like materials associated from a support framework that has tended to shorten the life of the apparatus as it accommodates relatively rough treatment by users thereof.

A first example of portable transport apparatus of this category for accommodation of various materials is set forth in U.S. Pat. No. 1,769,271 to Parsons wherein a wheelbarrow attachment for securement overlying a wheelbarrow to enhance transport and dumping of various materials and while of a rudimentary configuration, the Parsons patent sets forth the essence of providing a relatively durable container construction for transport of various materials.

U.S. Pat. No. 2,124,956 to Roemer sets forth a transport cart provided with a rigid framework for particular use in transport of concrete and provided with associated tires of a diameter equal to or greater than the height of the cart to accommodate the associated weight of the concrete. The Roemer patent is noted for the durability aspect associated with such vehicles, but lacks the ease of use of plastic-like containers.

U.S. Pat. No. 2,485,085 to Burch sets forth a transport vehicle provided with a pivotal forward end for accommodation of various loads thereof and is of interest relative to the cartlike framework associated with the Burch device for enabling transport of various materials.

U.S. Pat. No. 3,488,091 to Baker sets forth a manually manipulatable transport vehicle formed with a pivotal forward end and formed of a basket-like configuration for transport of bulky items, but provides essentially wheelbarrow-type orientation of a forward wheel as opposed to an underlying plurality of wheels, as set forth by the instant invention, with an associated cart to accommodate the center of gravity of materials transported by use of the instant invention.

U.S. Pat. No. 3,858,929 to Brescia sets forth a tiltable wheel structure representative of the prior art of the instant invention lacking, however, the necessary reenforcement and overtipping apparatus, as utilized by the instant invention, to prolong life and ease of use of the cart.

As such, it may be appreciated that there is a continuing need for a new and improved tilt truck apparatus which addresses both the problem of longevity of the apparatus as well as ease of use, and in this respect, the present invention substantially fulfills this need.

SUMMARY OF THE INVENTION

In view of the foregoing disadvantages inherent in the known types of tilt truck apparatus now present in the prior art, the present invention provides an tilt truck apparatus which provides accommodation and transport of various materials within a plastic-like body formed with re-enforcing upper perimeter bars with associated manipulatable abutments for preventing overtipping of the apparatus during an emptying procedure. As such, the general purpose of the present invention, which will be described subsequently in greater detail, is to provide a new and improved tilt truck apparatus which has all the advantages of the prior art tilt truck apparatus and none of the disadvantages.

To attain this, the present invention comprises a tilt truck apparatus which is nestably secured within a tubular framework formed with a first pair of centered wheels aligned with the center of gravity of the associated container and a rear pivotal wheel for maneuverability and stability of the apparatus during transport. A forward and rear reinforcing bar is provided to minimize the cracking and tearing of the container during usage thereof and is further formed with a plurality of manually manipulatable arcuate abutments for preventing overtipping of the apparatus when utilized in association of a flexible tether line securable from an extension of the rearwardmost reinforcing bar to the transport framework.

My invention resides not in any one of these features per se, but rather in the particular combination of all of them herein disclosed and claimed and it is distinguished from the prior art in this particular combination of all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tilt truck apparatus which has all the advantages of the prior art tilt truck apparatus and none of the disadvantages.

It is another object of the present invention to provide a new and improved tilt truck apparatus which may be easily and efficiently manufactured and marketed.

It is a further object of the present invention to provide a new and improved tilt truck apparatus which is of a durable and reliable construction.

An even further object of the present invention is to provide a new and improved tilt truck apparatus which is susceptible of a low cost of manufacture with regard to both materials and labor, and which accordingly is then susceptible of low prices of sale to the consuming public, thereby making such tilt truck apparatus economically available to the buying public.

Still yet another object of the present invention is to provide a new and improved tilt truck apparatus which provides in the apparatuses and methods of the prior art some of the advantages thereof, while simultaneously overcoming some of the disadvantages normally associated therewith.

Still another object of the present invention is to provide a new and improved tilt truck apparatus formed with reinforcement for enhancing effective life of the apparatus.

Yet another object of the present invention is to provide a new and improved tilt truck apparatus formed with manipulatable abutments for preventing overtipping of the apparatus during an emptying procedure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention in a transport mode.

FIG. 2 is an isometric illustration of the instant invention during an emptying procedure.

FIG. 3 is an orthographic view taken along the lines 3—3 of FIG. 1 in the direction indicated by the arrows.

FIG. 4 is a sectional orthographic view illustrating the tether line arrangement of the instant invention.

FIG. 5 is a top orthographic view of the detent organization utilized in association with the overtipping apparatus.

DESCRIPTION OF THE PREFERRED EMBODIMENT

With reference now to the drawings, and in particular to FIGS. 1 to 5 thereof, a new and improved tilt truck apparatus embodying the principles and concepts of the present invention and generally designated by the reference numeral 10 will be described.

More specifically, it will be noted that the tilt truck apparatus 10 essentially comprises a tub-like body formed of plastic-like material of generally high density plastic to accommodate prolonged usage. A planar upper terminal rim 11 projects outwardly of the body of the tub and terminates in a generally downwardly depending flange 11a generally parallel to the respective upper and lower side and rear walls 12 and 12a of the tub. The so-formed flange accommodates an upper perimeter framework 14 therein for nesting of the tub comfortably within the associated framework and wherein a forward sloping wall 13 is directed rearwardly and downwardly and forms an undercut 16 in conformity with an undercut provided between the upper and lower walls 12 and 12a defining the side and rear walls to accommodate a lower perimeter frame 15 within the undercut 16. The tub will then rest on a support platform 18 integrally formed between parallel connecting rails 17 that extend from the rear portion medially of the upper perimeter framework 14 downwardly and integrally securing the lower perimeter framework 15, as illustrated generally in FIG. 2, and formed with forward fulcrum curve portions 17a to enable tipping and emptying of the associated tub. A plurality of support wheels 19 are oriented rearwardly of the fulcrum curve portions 17a and are positioned to coincide with the apex of joining of the sloping forward wall 13 and the floor of the tub to provide a shallow base to enable tipping of the tub for emptying purposes thereof.

The support wheels 19 are secured to an axle 20 that is fixed to the rails 17 and accordingly provides rigidity to the support framework 22 as the parallel rails are integrally joined by the upper perimeter frame 14, the lower perimeter frame 15, the support platform 18, the axle 20 and finally terminating at the forward portion of the lower perimeter frame 15, as illustrated in FIG. 2. A pivot and stabilizing rear wall 21 is pivotally formed to an underlying surface of the support platform 18 for guidance and stability of the support framework 22 when transporting the tub.

Formed interiorly of the tub at a forward perimeter portion adjacent an interior surface of the forward wall 13 is a forward reinforcing bar 23 formed with securement flanges 24 at each terminal end and securing the bar to the upper wall portions 12 and thereby provides necessary rigidity to a forward portion of the tub during a tipping operation wherein similarly a rear reinforcing bar 25 is provided with rear securement flanges 26 that are joined to rear upper terminal interior faces of the upper wall 12 to accordingly provide necessary rigidity to the tub at flexure zones that have historically induced cracking and splitting of the tub.

A projecting extension 27 integrally and medially secured to reinforcing bar 25 projects through an upper rear wall surface 12 and is provided with a tether chain 28 that is fixedly secured integrally and medially to a rear rail of the upper perimeter frame 14 that during a tipping operation prevents disassociation of the tub and the support framework 22. Accordingly, the tether chain 28 is of sufficient length to enable a full forward tipping of the tub, as illustrated in FIG. 2 and maintain alignment of the tub with the associated nesting cavity formed within the framework 22.

The use of such tubs when the contents are tipped forwardly has induced overtipping and to this extent, a plurality of arcuate abutment bars 29 are slidably formed to the forwardmost portions of side wall areas 12 and are slidable within guide straps 34 securely formed to the walls 12 on either side thereof. Retraction stops 30 are formed projecting through side surfaces of the bars 29 to prevent complete withdrawal of the bars from the guide straps 34. A detent knob 32 is formed with a terminal end that associates with a detent recess 31 to maintain the bars in an extended orientation, as illustrated in FIG. 2. A spring housing 36 overlies the guide strap 34 and captures a spring 35 therebetween with a spring cup 33a formed on the shank 33 of the detent knob 32.

It may be appreciated therefore that during an emptying procedure, the cooperation of the abutment bars 29 and the tether chain 28 maintain a centering and a prevention of overtipping of the tub, as illustrated in FIG. 2, and thereby accommodates a return of the tub into a nested position with the support framework 22, as illustrated in FIG. 1. In this manner and in cooperation with the re-enforcing bars 23 and 25, longevity and utility of the apparatus over an extended life cycle is provided.

As to the manner of usage and operation of the present invention, the same should be apparent from the above description. Accordingly, no further discussion relative to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tilt truck apparatus comprising a framework means including an upper perimeter framework and a lower perimeter framework secured together by downwardly extending rails;
    said rails secured to said upper perimeter framework at first ends and joined to said lower perimeter framework underlying said upper perimeter framework, and
    curving to underlie said upper and lower framework including a planar platform for support of a tub on said platform and to maintain said tub within said upper and lower perimeter frameworks, and
    wheel means secured to said downward extending rails underlying said upper and lower perimeter frameworks, and a tub comprised of a sloping forward wall, a rear wall, and side walls, said side walls having upper and lower portions, and
    said tub including a downwardly depending flange spaced from side walls of said tub for overlying said upper perimeter framework, and
    a forward and rear reinforcing bar positioned between upper interior side walls of said tub adjacent to but spaced from said depending flange, and
    tether means joining said rear reinforcing bar and a rear member of said upper perimeter framework to prevent overtipping of said tub during emptying of said tub, and whereby the tilt truck can be tilted upwardly and forwardly so as to tilt the tub relative to the framework so as to dump the contents therefrom.

2. A tilt truck apparatus as set forth in claim 1 wherein said forward and rear reinforcing bars are parallel to each other.

3. A tilt truck apparatus as set forth in claim 2 wherein said forward and rear reinforcing bars are formed with flanges integrally secured to said interior side walls.

4. A tilt truck apparatus as set forth in claim 3 wherein an extension is integrally formed to said rear reinforcing bar and extending through a rear side wall of said tub wherein said tether means is a flexible chain secured at one end to said extension and at a second end to said rear member centrally of said member to prevent overtipping of said tub during emptying of said tub and maintain alignment of said tub within said framework means during emptying of said tub.

5. A tilt truck apparatus as set forth in claim 4 further including arcuate abutment bars slidably secured within guide straps wherein said guide straps are integrally secured to exterior surfaces of said side walls adjacent said forward reinforcing bar.

6. A tilt truck apparatus as set forth in claim 5 wherein said arcuate abutment bars are formed with stop elements extending laterally of said bars on each end of said bars to prevent said bars from removal from within each respective guide strap.

7. A tilt truck apparatus as set forth in claim 6 wherein said arcuate abutment bars further include a spring biased detent formed with a forward end cooperating with a detent recess within a lower exterior surface of said abutment bars to maintain said abutment bars in an extended outward position.

8. A tilt truck apparatus as set forth in claim 7 wherein said detent further includes a housing overlying said guide strap capturing a spring between said housing and said guide strap and cooperating with a spring cup integrally formed to an extended shank of said detent to maintain said detent in a normally interengaging orientation with said abutment bars.

* * * * *